United States Patent Office 2,739,995
Patented Mar. 27, 1956

2,739,995
PREPARATION OF CONJUGATED DIENES

John W. Copenhaver, Short Hills, N. J., assignor to General Aniline & Film Corporation, New York, N. Y., a corporation of Delaware No Drawing. Application June 29, 1951,
Serial No. 234,447

2 Claims. (Cl. 260—681)

This invention relates to the preparation of conjugated dienes from alkoxy-containing compounds.

I have discovered that conjugated dienes or dimers thereof may be prepared by treatment of a compound containing the group

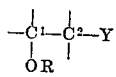

wherein Y is a radical selected from the group consisting of

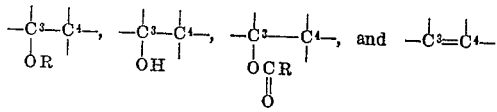

and is joined to the $C^2$ atom through the $C^3$ atom, and wherein R is alkyl, in the presence of heat and an acidic catalyst. Thus, the reaction may be formulated as follows:

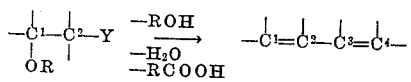

in which Y and R have the values mentioned above.

As compounds from which conjugated dienes may be produced in accordance with this invention may be mentioned, by way of example only, the acetate of phenyl-2-methoxy-propyl carbinol; the acetate of 2-methyl-4-methoxy pentanol-2; 2,2,4-trimethyl-6-methoxy heptanol-4 and its acetate; 2,2,4-trimethyl-6-methoxy heptene-3; 1,3-dimethoxy - 1 - phenyl propane; 1,3 - dimethoxy - 1 - phenyl butane; 1,3 - dibutoxy - 1,3 - diphenyl propane; 2,4 - dimethoxy - 2 - methyl pentane; 1 - methyl - 3 - phenyl - 1,3-dimethoxy butane; 1,3 - dimethoxy - 1 - methyl butane, and the like. The production of compounds in which Y contains an acyloxy group, hydroxy group, or ethylene group is disclosed in applicant's copending application Serial No. 234,446 filed on even date herewith. The preparation of compounds in which Y contains an alkoxy group or an ethylene group is disclosed in applicant's co-pending application Serial No. 234,445, also filed on even date herewith.

From the foregoing description, it will be apparent that the reaction involves in all cases a dealcoholization, which may be combined with a dehydration or a de-esterification. This transformation is effected by heating the appropriate compound with an acidic catalyst such as a mineral acid, organic sulfonic acid or metallic chloride. In general, any non-volatile or Friedel-Craft's type acid material may be used as the catalyst in the process. When carried out in the vapor phase, the compound may be passed over such catalysts as phosphoric acid on an inert carrier, and similar catalysts in the presence of heat.

In general, it is desirable to operate at as low a temperature range as possible. When the process is carried out in a liquid, the temperature may range from about 75° C. to about 165° C. or somewhat higher. The use of pressure offers no particular advantage except perhaps when operating in liquid phase with gaseous components. It is not always necessary to maintain anhydrous conditions and the reaction may be carried out in the presence of a diluent if desired.

In some cases, particularly where the diene product is of relatively low boiling point, the diene distils over as it is formed along with alcohol, with or without water or carboxylic acid, depending upon the compound being acted upon, and is subsequently isolated therefrom usually by water washing, drying and distilling. In other cases, particularly when using hydrobromic acid as a catalyst or where the diene has a relatively high boiling point, the major reaction product is a dimer of the expected diene.

The following examples illustrate specific embodiments of the invention, although it is to be understood that the invention is not to be limited thereby.

Example 1.—Preparation of the dimer of 2-methyl pentadiene-1,3

32 g. (0.21 mole) 2-methyl-4-methoxypentanol-2 and 95 g. hydrobromic acid (48%) were refluxed for 4 hours, the organic layer separated, washed with water and then bicarbonate, dried and distilled to give 11 g. of a product boiling at 96° C./65 mm., $N_D^{25}$ 1.4719.

*Analysis.*—Calc. for $(C_6H_{10})_x$: C, 88.09; H, 11.91. Found: C, 88.20; H, 12.05.

The analysis of the product and its physical constants correspond to the dimer of 2-methyl-pentadiene-1,3.

Example 2.—Preparation of 2-methyl-pentadiene-1,3

28 g. 2-methyl-4-methoxypentanol-2 and 2.8 g. p-toluene sulfonic acid were mixed and heated under reflux for about 1 hour and then distilled to give 16 g. of a product boiling at 52–54° C., $N_D^{25}$ 1.4020 which is presumably an azeotrope of methanol and 2-methyl-pentadiene. This distillate was washed with water, dried and distilled to give 2-methyl pentadiene-1,3, boiling point 75–75.5° C., $N_D^{25}$ 1.4418.

*Analysis.*—Calc. for $C_6H_{10}$: C, 88.09; H, 11.96. Found: C, 87.92; H, 12.09.

Example 3.—Preparation of isoprene 33 g. of 2-methyl-2,4-dimethoxybutane and 0.25 g. of p-toluene sulfonic acid were heated in a flask attached to a small fractionating column with an ice water cooled condenser. The material boiling at 27 to 41° C. was collected, washed with water to remove methanol and dried over calcium chloride. The residual liquid was characterized as isoprene as follows: One gram of the product was cooled to —10° C. and 4 g. liquid sulfur dioxide added. After 2 days at —10 to 0° C., and the volatile material was allowed to evaporate and the residue crystallized from water to give a white crystalline adduct, M. P. 64–65° C. Jones and Williams, J. Chem. Soc. 1934, 824, report M. P. 63.5° C. for the adduct of isoprene and sulfur dioxide. A similar reaction with maleic anhydride in benzene solution gave a white crystalline adduct melting at 63.5–64.5° C. Bassett and Williams, J. Chem. Soc. 1932, 2323, report M. P. 64° C. for the adduct of maleic anhydride and isoprene.

Example 4.—Dimer of 2,2,4-trimethyl-heptadiene-3,5

25 g. of 2,2,4-trimethyl-6-methoxy heptene-3 and 0.5 g. p-toluene sulfonic acid were mixed in a flask and heated to 125° C. over 45 minutes, then distilled, removing methanol as rapidly as the temperature could be held at 64–65° C. After removing 20 ml. of methanol, the residue was washed with water, 5% NaOH solution, water and distilled to give a product boiling at 144–146° C./10 mm., $N_D^{25}$ 1.4733.

*Analysis.*—Calc. for $C_{20}H_{36}$: C, 86.87; H, 13.13; Mol. Wt. 276. Found: C, 87.09; H, 13.11; Mol. Wt. 274.

This analysis of the product together with its physical data characterizes the product as the dimer of 2,2,4-trimethyl-heptadiene-3,5.

The products of this invention may be employed wherever conjugated dienes have been heretofore found useful, as for example, in the manufacture of polymers therefrom, as intermediates in the manufacture of other products, and the like.

My invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

I claim:

1. A method of producing the dimer of 2,2,4-trimethyl-heptadiene-3,5 by heating 2,2,4-trimethyl-6-methoxy heptene-3 in the presence of p-toluene sulfonic acid.

2. The dimer of 2,2,4-trimethyl-heptadiene-3,5 prepared in accordance with the process of claim 1.

References Cited in the file of this patent

UNITED STATES PATENTS

| | | |
|---|---|---|
| 2,184,164 | Mueller-Cunradi et al. | Dec. 19, 1939 |
| 2,229,652 | Halbig et al. | Jan. 28, 1941 |
| 2,369,068 | Morey | Jan. 23, 1945 |
| 2,561,483 | Seon et al. | July 24, 1951 |

FOREIGN PATENTS

| | | |
|---|---|---|
| 268,101 | Germany | Dec. 9, 1913 |
| 524,849 | Great Britain | Aug. 15, 1940 |
| 211,659 | Switzerland | Jan. 2, 1941 |
| 969,925 | France | May 31, 1950 |

OTHER REFERENCES

Egloff et al.: "Methods of Preparing Butadiene," part 7, Oil and Gas Journal, December 17, 1942, page 36.